US012748224B2

(12) United States Patent
Pausch et al.

(10) Patent No.: US 12,748,224 B2
(45) Date of Patent: Sep. 29, 2026

(54) SYSTEM AND METHOD TO COUNT NEUTRONS

(71) Applicant: TARGET SYSTEMELEKTRONIK GMBH & CO. KG, Wuppertal (DE)

(72) Inventors: Guntram Pausch, Dresden (DE); Juergen Stein, Wuppertal (DE)

(73) Assignee: Rapiscan Holdings, Inc., Torrance, CA (US)

( * ) Notice: Subject to any disclaimer, the term of this patent is extended or adjusted under 35 U.S.C. 154(b) by 264 days.

(21) Appl. No.: 18/541,836

(22) Filed: Dec. 15, 2023

(65) Prior Publication Data

US 2024/0159921 A1 May 16, 2024

Related U.S. Application Data

(63) Continuation of application No. PCT/EP2021/061467, filed on Apr. 30, 2021.

(51) Int. Cl.

*G01T 1/20* (2006.01)
*G01T 1/202* (2006.01)
*G01T 3/06* (2006.01)

(52) U.S. Cl.

CPC ............ *G01T 1/2018* (2013.01); *G01T 1/202* (2013.01); *G01T 3/06* (2013.01)

(58) Field of Classification Search

CPC ......... G01T 1/2018; G01T 1/202; G01T 3/06; G01T 3/065; G01T 1/20

See application file for complete search history.

(56) References Cited

U.S. PATENT DOCUMENTS 2,982,860 A 5/1961 Nehrbas
3,089,955 A 5/1963 Scherbatskoy
(Continued)

FOREIGN PATENT DOCUMENTS

CN 201021941 2/2008
CN 101939783 1/2011
(Continued)

OTHER PUBLICATIONS

Bjorn J Scholz, "First Observation Of Coherent Elastic Neutrino-Nucleus Scattering", arxiv.org, Cornell University Library, 201 Olin Library Cornell University Ithaca, NY 14853, (Apr. 2, 2019), doi:10.1007/978-3-319-99747-6, XP081163650.
(Continued)

*Primary Examiner* — Kiho Kim
(74) *Attorney, Agent, or Firm* — Novel IP

(57) ABSTRACT

A radiation detection system and a method for a parallel detection of gamma-rays and neutrons are provided, comprising a gamma-ray detector comprising a scintillator crystal comprising $^{127}I$, a digitizer to generate digitized time series and an analyzer, characterized in that the analyzer is adapted to identify a primary signal component, a first delayed signal component and a second delayed signal component in the digitized time series. The first and second delayed signal components, respectively, correspond to an energy deposition of about 30 keV and about 138 keV, and follow the primary and first delayed signal components in time. The analyzer is further adapted to count the number of digitized time series comprising at least the first and the second delayed signal components as neutron events, thereby providing a measure for a neutron flux the scintillator crystal is exposed to.

20 Claims, 5 Drawing Sheets

(56) References Cited

U.S. PATENT DOCUMENTS

| | | | | |
|---|---|---|---|---|
| 3,171,032 | A | 2/1965 | Holt | |
| 3,184,597 | A | 5/1965 | Scherbatskoy | |
| 3,428,804 | A | 2/1969 | Comunnetti | |
| 3,515,878 | A | 6/1970 | Ried, Jr. | |
| 3,922,541 | A | 11/1975 | Seeman | |
| 4,209,695 | A * | 6/1980 | Arnold | G01N 23/222 250/261 |
| 4,272,677 | A | 6/1981 | Berthold | |
| 4,618,775 | A | 10/1986 | Persyk | |
| 4,717,825 | A | 1/1988 | Smith, Jr. | |
| 4,820,914 | A | 4/1989 | Allen | |
| 4,883,956 | A | 11/1989 | Melcher | |
| 4,918,314 | A | 4/1990 | Sonne | |
| 5,079,424 | A | 1/1992 | Kobayashi | |
| 5,198,670 | A | 3/1993 | Vancauter | |
| 5,218,202 | A | 6/1993 | Evers | |
| 5,298,756 | A * | 3/1994 | McCollum | G01T 3/06 250/390.11 |
| 5,360,975 | A | 11/1994 | Stoller | |
| 5,548,111 | A | 8/1996 | Nurmi | |
| 5,600,135 | A | 2/1997 | Jacobson | |
| 5,866,907 | A | 2/1999 | Drukier | |
| 6,021,341 | A | 2/2000 | Scibilia | |
| 6,087,656 | A | 7/2000 | Kimmich | |
| 7,005,646 | B1 | 2/2006 | Jordanov | |
| 7,157,681 | B1 | 1/2007 | Tetzlaff | |
| 7,253,761 | B1 | 8/2007 | Hoyos | |
| 7,480,362 | B2 | 1/2009 | Carmi | |
| 9,269,552 | B2 | 2/2016 | Steiner | |
| 9,411,058 | B2 | 8/2016 | Penumadu | |
| 9,864,076 | B2 | 1/2018 | Stein | |
| 10,048,393 | B2 | 8/2018 | Stein | |
| 10,061,041 | B2 | 8/2018 | Rowland | |
| 10,520,612 | B2 | 12/2019 | Stein | |
| 10,527,742 | B2 | 1/2020 | Stein | |
| 10,859,718 | B1 | 12/2020 | Nagarkar | |
| 11,105,940 | B2 | 8/2021 | Iwatschenko-Borho | |
| 11,163,076 | B2 | 11/2021 | Stein | |
| 11,448,777 | B2 | 9/2022 | Stein | |
| 11,693,134 | B2 | 7/2023 | Behar | |
| 2004/0016867 | A1 | 1/2004 | Milshtein | |
| 2005/0258371 | A1 | 11/2005 | Stein | |
| 2006/0081786 | A1 | 4/2006 | Berthold | |
| 2006/0126776 | A1 | 6/2006 | Izumi | |
| 2006/0289775 | A1 | 12/2006 | Inbar | |
| 2007/0013899 | A1 | 1/2007 | Wolters | |
| 2009/0146073 | A1 | 6/2009 | Stein | |
| 2009/0230285 | A1 | 9/2009 | Wright | |
| 2009/0272910 | A1 | 11/2009 | Grynyov | |
| 2010/0020922 | A1 | 1/2010 | Carmi | |
| 2010/0065746 | A1 | 3/2010 | Grazioso | |
| 2010/0090114 | A1 | 4/2010 | Bauer | |
| 2010/0301196 | A1* | 12/2010 | Chu | H01J 27/26 977/750 |
| 2011/0031405 | A1 | 2/2011 | Kulik | |
| 2011/0091207 | A1 | 4/2011 | Xie | |
| 2011/0101230 | A1 | 5/2011 | Inbar | |
| 2011/0182407 | A1 | 7/2011 | Morton | |
| 2011/0186740 | A1 | 8/2011 | Normand | |
| 2011/0204243 | A1* | 8/2011 | Bendahan | H01J 40/04 250/367 |
| 2011/0211675 | A1 | 9/2011 | Ramsden | |
| 2012/0175514 | A1 | 7/2012 | Izumi | |
| 2012/0305783 | A1 | 12/2012 | Gagnon | |
| 2012/0314827 | A1 | 12/2012 | Dioszegi | |
| 2013/0256520 | A1 | 10/2013 | Korkin | |
| 2013/0299702 | A1 | 11/2013 | Zaitseva | |
| 2014/0061488 | A1 | 3/2014 | Sato | |
| 2014/0077073 | A1 | 3/2014 | Vu | |
| 2014/0084149 | A1 | 3/2014 | Stoller | |
| 2014/0151529 | A1 | 6/2014 | Steiner | |
| 2014/0151549 | A1 | 6/2014 | Steiner | |
| 2014/0348286 | A1 | 11/2014 | Rowland | |
| 2015/0162174 | A1 | 6/2015 | Badiei | |
| 2015/0212218 | A1 | 7/2015 | Manslow | |
| 2015/0247938 | A1 | 9/2015 | Penumadu | |
| 2015/0327827 | A1 | 11/2015 | Teshigawara | |
| 2016/0003671 | A1 | 1/2016 | Fontbonne | |
| 2016/0223494 | A1 | 8/2016 | Steiner | |
| 2016/0291196 | A1 | 10/2016 | De Vita | |
| 2016/0372309 | A1 | 12/2016 | Steiner | |
| 2017/0227659 | A1 | 8/2017 | Stein | |
| 2018/0275309 | A1 | 9/2018 | Berheide | |
| 2018/0336976 | A1 | 11/2018 | Pozzi | |
| 2019/0212458 | A1 | 7/2019 | Iwatschenko-Borho | |
| 2022/0326401 | A1 | 10/2022 | Aronkytö | |
| 2023/0003910 | A1 | 1/2023 | Stein | |
| 2023/0400597 | A1 | 12/2023 | Stein | |
| 2024/0159921 | A1* | 5/2024 | Pausch | G01T 1/20 |

FOREIGN PATENT DOCUMENTS

| | | | |
|---|---|---|---|
| DE | 2826484 | | 12/1979 |
| DE | 10209161 | | 9/2003 |
| EP | 2354809 | | 8/2011 |
| EP | 3401706 | A1 | 11/2018 |
| GB | 2023814 | | 1/1980 |
| JP | S5819024 | | 4/1983 |
| JP | H0197892 | | 4/1989 |
| JP | 2002357692 | | 12/2002 |
| RU | 2276352 | C2 | 5/2006 |
| WO | 9002415 | | 3/1990 |
| WO | 2011012155 | A1 | 2/2011 |
| WO | 2012080443 | | 6/2012 |
| WO | 2013116241 | A1 | 8/2013 |
| WO | 2014136990 | | 9/2014 |
| WO | 2016066185 | | 5/2016 |
| WO | 2017202793 | A1 | 11/2017 |
| WO | 2017202793 | A9 | 1/2018 |

OTHER PUBLICATIONS

Carter J et al, "Detectors for Gamma-Ray Burst Astronomy", Space Science Instrumentation,, (May 1, 1977), vol. 3, No. 2, pp. 123-129, XP001431870 Abstract Only.

International Search Report for PCT/EP2021/061467, Jan. 19, 2022.

International Search Report for corresponding International Application No. PCT/EP2015/060390 dated Aug. 31, 2015.

International Search Report for corresponding International Application No. PCT/EP2015/060384 dated Aug. 26, 2015.

Chen C et al, "Front-end electronics for the CDF-II time-of-flight system", IEEE Transactions on Nuclear Science, IEEE Service Center, New York, NY, US, (Dec. 1, 2003), vol. 50, No. 6, doi:10.1109/TNS.2003.820632, ISSN 0018-9499, pp. 2486-2490, XP011106678.

International Search Report issued for International Patent Application No. PCT/EP2015/074282 dated Jun. 28, 2016.

Chen et al.: "Front-end electronics for the CDF-II time-of-flight system", IEEE Transactions on Nuclear Science, vol. 50, No. 6, pp. 2486-2490, IEEE Service Center, New York, NY, Dec. 1, 2003.

International Search Report with a Written Opinion issued for corresponding International Application No. PCT/EP2014/073037 dated Jul. 24, 2015.

[XAI]—Wen Xianfei et al., "Measuring the scintillation decay time for different energy deposited by [gamma]-rays and neutrons in a Cs2LiYCl6: Ce3+detector", Nuclear Instruments & Methods in Physics Research. Section A: Accelerators, Spectrometers, Detectors, and Associated Equipment, Elsevier BV North-Holland, NL, (Feb. 9, 2017), vol. 853, doi:10.1016/J.NIMA.2017.02.019, ISSN 0168-9002, pp. 9-15, XP029936730.

Kyle Polack et al. "Dual-Particle Imager for Standoff Detection of Special Nuclear Material", IEEE Nuclear Science Symposium Conference Record, Oct. 23, 2011, pp. 1494-1500, IEEE.

Soundara-Pandian L et al, "Lithium Alkaline Halides-Next Generation of Dual Mode Scintillators", IEEE Transactions on Nuclear Science, IEEE Service Center, New York, NY, US, vol. 63, No. 2, doi:10.1109/TNS.2016.2535355, ISSN 0018-9499, (20160401), pp. 490-496, (Apr. 18, 2016), XP011606934.

(56) References Cited

OTHER PUBLICATIONS

International Search Report issued by the International Searching Authority for corresponding International Patent Application No. PCT/EP2018/061938, dated Jul. 25, 2018.
Soundara-Pandian et al., "Lithium Alkaline Halides-Next Generation of Dual Mode Scintillators", IEEE Transactions on Nuclear Science, Apr. 1, 2016, pp. 490-496, vol. 63, No. 2, IEEE Service Center, NY, NY.
Wen et al. "Measuring the scintillation decay time for different energy deposited by [gamma]-rays and neutrons in a Cs2LiYCI6:Ce3+ detector" Nuclear Instruments & Methods in Physics Research, Section A: Accelerators, Spectrometers, Detectors, and Associated Equipment, Feb. 9, 2017, pp. 9-15, vol. 853, Elsevier BV, North-Holland, NL.
International Search Report for corresponding International Application No. PCT/EP2019/061977 dated Jul. 17, 2019.
International Search Report issued for International Patent Application No. PCT/EP2020/055875, mailed on Oct. 15, 2020.
Bartle et al., "Small inorganic scintillators as neutron detectors," Nuclear Instruments and Methods in Physics Research, Section A, pp. 54-58, Elsevier Science B.V., 1999.
Holm et al., "Neutron detection with a Nal spectrometer using high-energy photons, " Nuclear Instruments and Methods in Physics Research, Section A, pp. 59-63, Elsevier Science B.V., Sep. 12, 2012.
Pausch et al., "Neutron detection based on capture-gamma sensing and calorimetry," Active and Passive Signatures III, Proc. of SPIE, vol. 8382, 838209, SPIE, 2012.
Yakushev et al., "Sensitive neutron detection method using delayed coincidence transitions in existing iodine-containing detectors", Nuclear Instruments and Methods in Physics Research A, 2017, pp. 162-165, vol. 848, Elsevier B.V.
Sudeep MITRA, "Time-Sequenced Prompt y Neutron Activation Analysis", Encyclopedia of Analytical Chemistry, 2009, pp. 1-16, John Wiley & Sons, Ltd.
International Search Report issued by the European Patent Office for International Patent Application No. PCT/ EP2021/054154, dated Oct. 26, 2021.
Blaj et al., "Optimal Pulse Processing, Pile-Up Decomposition, and Applications of Silicon Drift Detectors at LCLS", IEEE Transactions on Nuclear Science, Nov. 2017, pp. 2854-2868, vol. 64, No. 11, IEEE.
Födisch et al., "Digital high-pass filter deconvolution by means of an infinite impulse response filter", Nuclear Instruments and Methods in Physics Research A, Jun. 11, 2016, pp. 484-496, vol. 830, Elsevier B.V.
Georgiev et al., "Digital Pulse Processing in High Resolution, High Throughput Gamma-Ray Spectroscopy", IEEE Transactions on Nuclear Science, Aug. 1993, pp. 770-779, vol. 40, No. 4, IEEE.
Mitchell et al., "Neutron Detection With Gamma-Ray Spectrometers for Border Security Applications", IEEE Transactions on Nuclear Science, Aug. 18, 2010, pp. 2215-2219, vol. 57, No. 4, IEEE.
Pausch et al., "Neutron detection by measuring capture gammas in a calorimetric approach", Nuclear Instruments and Methods in Physics Research A, Sep. 8, 2010, pp. 374-380, Elsevier B.V.
Scoullar et al., "Real Time Pulse Pile-up Recovery in a High Throughput Digital Pulse Processor", Applications of Nuclear Techniques, API Conf. Proc. 1412, 2011, pp. 270-277, American Institute of Physics.

* cited by examiner

SYSTEM AND METHOD TO COUNT NEUTRONS

CROSS REFERENCE TO RELATED APPLICATIONS

This application is a continuation of International Application No. PCT/EP2021/061467, filed Apr. 30, 2021, the contents of which are incorporated by reference herein.

FIELD OF THE INVENTION

The present invention relates to the field of radiation detection, more specifically the parallel detection of neutrons and gamma rays.

BACKGROUND

Neutrons emitted from spontaneous or induced fission provide a strong signature for the presence of Special Nuclear Material (SNM). The detection of SNM is of particular interest for homeland security applications—portal monitors, handheld instruments, backpack monitors, etc. Further, the simultaneous detection of neutrons and gamma rays as such is of particular interest for the monitoring of nuclear (power) systems and particle accelerators as well as for geophysical borehole investigations.

An efficient simultaneous detection of (slow) neutrons and gamma rays by just one detector instead of two types of detectors thereby would be a major advantage for the detection of SNM—not only in the context of homeland security applications.

Neutrons are neutral particles carrying a mass and a magnetic moment. Due to their nature, the interaction of neutrons with matter (disregarding their magnetic moment) is bound to an interaction with nuclei, and therefore occurs with low probabilities for most materials.

The (kinetic) energies of free neutrons span a range of many orders of magnitude. A large fraction of neutrons emitted in spontaneous or induced fission reaction have energies of up to 10 MeV, classified into three neutron energy regimes: slow neutrons (<1 keV), intermediate neutrons (1 keV to 0.5 MeV) and fast neutrons (0.5 MeV to 10 MeV).

The interaction of neutrons with matter—as neutron capture or neutron scattering—strongly depends on the neutron energy. Slow neutrons, in particular thermal neutrons, i.e. neutrons whose kinetic energy distribution corresponds to the Boltzmann distribution at room temperature, are more likely to be captured than fast neutrons. The neutron cross section defines the likelihood of an interaction between a neutron and a nucleus.

Most of the conventional neutron detection methods are based on the $^{3}He(n,p)\,^{3}H$, the $^{6}Li(n,\alpha)\,^{3}H$, or the $^{10}B(n,\alpha)^{7}Li$ reactions. These reactions emit ionizing particles, which are easy to detect and well distinguishable from gamma rays. Further, $^{3}He$, $^{6}Li$ and $^{10}B$ are distinguished by a large capture cross section for thermal neutrons.

The emitted charged particles generate short but dense ionization tracks with ranges of a few micrometers in solids, and up to some millimeters in gases of appropriate pressure. Consequently, the neutron-capturing component must be either a constituent of the detection medium (as, e.g., in $^{3}He$ and $BF_3$ tubes, scintillators comprising $^{6}Li$), or it must be provided as a thin layer in close contact with the detector medium (as, e.g., in $^{10}B$-coated proportional counters). The neutron-capturing component should consist of isotope-separated nuclides to avoid competing neutron-capture reactions reducing the detection efficiency. Therefore, corresponding detectors are often expensive. In addition, $^{3}He$ has become very expensive recently due to a serious shortage.

Previously, scintillator crystals comprising natural Li or isotopically enriched or separated $^{6}Li$ for a parallel detection of neutrons and gamma rays have been developed, amongst them CLYC (Glodo et al., IEEE Trans. Nucl. Sci. 55 (2008) 1206), CLLB (Shirwadkar et al., Nucl. Instr. Meth. In Phys. Res. A 652 (2011) 268), or NAIL (Yang et al., IEEE TNS 64 (2017) 2406). These advanced scintillator materials allow to distinguish neutron and gamma-ray interactions by analyzing the pulse shape of the detector signals. Neutron interactions produce tritons and alpha particles, while gamma-ray interactions produce photoelectrons, Compton electrons, or electron-positron pairs. Hence, scintillation detectors providing a reasonable efficiency for neutron detection as well as good spectroscopic performance for gamma ray detectors may be constructed using such scintillator crystals. However, these scintillator crystals are more complex and therefore expensive, rendering the price of corresponding detectors to numbers exceeding the price of common NaI(Tl) detectors of equal size by a factor of at least 2 to 5. As a result, such detectors may even become more expensive than a combination of a common NaI(Tl) gamma detector and a separate neutron detector (e.g., a $^{3}He$ tube).

An alternative and cheaper solution for neutron detection in applications that are utilizing gamma ray detectors anyway is based on neutron capture reactions with subsequent emission of gamma rays, so-called Neutron Capture Detectors (NCD). An NCD detects neutrons by measuring the gamma radiation following neutron captures in a neutron-gamma converter arranged around or comprised in the gamma-ray detector, as disclosed in EP 24 600 32 A1 and WO 2011/012155 A1. Naturally, a major challenge of any NCD is to discriminate between the signal of gamma rays stemming from neutron capture and signal of ubiquitous gamma rays of external sources.

In neutron capture reactions a neutron is trapped by a nucleus $^{A}X$ resulting in a daughter nucleus $^{A+}X$ with an excitation corresponding to the neutron separation energy $S_n(^{A+1}X)$ of the daughter nucleus. Subsequently, this energy is released in form of a gamma-ray cascade. The cascade may involve continuum states and distinct gamma transitions. The discrete lines represent fingerprints of the capturing nuclide or a mixture of nuclides, e.g. of chemical elements in their natural isotope composition. The gamma rays emitted upon thermal neutron capture, in particular the so-called "prompt gamma rays from slow neutron capture" are used for elemental analysis by neutron activation, e.g. in homeland security applications and borehole investigations. The energies and intensities of prompt gamma rays from neutron capture are continually being characterized and tabulated, e.g. in the "Database of prompt gamma rays from slow neutron capture for elemental analysis", IAEA (2007).

The detection of gamma rays generally is based on the measurement of electric currents. The electrons and positrons produced in gamma-ray interactions with the detector medium either directly produce electron-hole pairs in semiconductor materials or are converted into electric current by means of a scintillator material and a photodetector with internal or external amplification.

EP 17 170 025.5 relates to a method to detect both gamma rays and fast neutrons using a scintillator crystal providing different light pulse shapes for recoil electrons and recoil nuclei, such as Tl-doped NaI, for homeland security applications. This method is restricted, however, to the detection of fast neutrons.

EP 24 600 32 A1 relates to an NCD comprising a gamma ray detector supplemented with neutron-gamma converters for an as much as possible calorimetric detection of the gamma-ray cascades following neutron capture reactions. The limitation of this approach is due to the sensitivity of an NCD for ambient gamma radiation.

WO 2011/012155 A1 relates to an NCD consisting of one or more gamma ray detectors comprising a neutron-gamma converting isotope of a chemical element used as constituent or dopant of the active detector material for an as much as possible calorimetric detection of the gamma-ray cascades following neutron capture reactions. The limitation of this approach is due to the sensitivity of an NCD for ambient gamma radiation.

So far, the only way to distinguish between neutron capture gamma rays and gamma rays of other sources in an NCD is the rejection of detector signal corresponding to energy depositions below approximately 3 MeV, the NCD threshold, for being considered as neutron signals, since common radioactive nuclides do not emit noticeable fractions of gamma rays with energies above 2615 keV.

The major drawback of signal rejection below the NCD threshold is that neutron-capture gamma-ray cascades leading to energy dispositions in the gamma-ray detector below the NCD threshold are also rejected. Such cases would not occur if the NCD warranted a truly calorimetric detection of neutron-capture gamma-ray cascades. In practice the calorimetric regime could only be approached by an appropriate construction and by using a reasonably large and dense gamma-ray detector. Hence, the NCD threshold reduces the probability of detecting neutrons, i.e. the sensitivity of the detector. The sensitivity loss scales with the deviation from a truly calorimetric regime. Therefore, large sizes and corresponding high weights of NCD are required to counteract on the delimiting conditions of an NCD imposed by the NCD threshold.

Yakushev et al proposed in Nucl.Inst.Meth. A 848 (2017) 162 a method for thermal neutron detection in scintillators comprising iodine, as common Tl-doped NaI scintillators. Natural iodine only consists of the stable $^{127}$I isotope which provides a relatively large thermal neutron capture cross section of about 6.2 barn. This cross section is large enough to absorb a considerable fraction of thermal neutrons interacting with a Tl-doped NaI scintillator of usual dimensions (2-3" diameter, 2-3" height). The de-excitation cascade following neutron capture on $^{127}$I often involves the 137.8 keV state in $^{128}$I having a half-life ($T_{1/2}$) of 845 ns. The de-excitation cascade of the 137.8 keV state in $^{128}$I involves low-energy gamma rays and converted transitions of which a large fraction is detected in the NaI detector itself—with a certain delay following the prompt part of the de-excitation cascade which may also be at least partially absorbed and then generate a signal in the NaI detector. Consequently, the resulting electric current signal of a gamma-ray cascade upon thermal neutron capture sometimes exhibits a double pulse within a time window of a few microseconds, wherein the delayed pulse fits to an energy deposition of approximately 138 keV. Hence, neutrons are detected if the distribution of time differences of double pulses exhibits the 845 ns decay component, whereby the strength of the 845 ns decay component reflects the thermal neutron flux the NCD is exposed to.

Using the technique of Yakushev et al, thermal neutrons can be discriminated from a gamma radiation background stemming from other (external) sources as long as the background is low enough to not significantly contaminate the double-pulse time-difference distribution by random pulse pile-ups. According to Yakushev et al, however, the analysis of the double pulses resulting from delayed gamma rays upon neutron capture is only possible because the time constant of the delayed gamma emission, 845 ns, is large in comparison to the light decay time of the Tl-doped NaI scintillator used in the demonstration which is approximately 250 ns.

While Yakushev et al's method is based on common NaI(Tl) scintillators, which are relatively cheap and widely used for gamma-ray spectroscopy in numerous applications, a number of disadvantages results from said method:

- Said method is based on searching for double pulses in a sequence of well separated signals, i.e. detecting and discriminating pulse by pulse in the event data stream. Consequently, the dead time of the digitizer (trigger holdoff) was set to 1.8 us such that delayed pulses having less than 1.8 us delay to the prompt signal were not detectable. This trigger hold off ensures that the delayed signal component does not pile up with the prompt signal component. In case of a half-life of 845 ns, the law of radioactive decays yields a fraction of only 23% of all delayed emissions that are emitted later than 1.8 us after the prompt part of the cascade. This means that more than % of the delayed gamma emissions are not detectable with a holdoff time as stated by Yakushev et al.

Said method requires the delayed pulses to not pile-up with the prompt signal in order to measure their energy deposited in the scintillator crystal and the time delay of distinct signals following each other.

- Though said method generally allows measuring neutrons in a background of ambient gamma radiation, the background suppression is not good enough for detecting a small neutron flux in strong gamma radiation fields, which is a standard task in homeland-security applications.

Sakharov et al. (Nucl. Phys. A528 (1991) 317) investigated the level scheme of $^{128}$I. They state that the long-lived 137.85 keV state in $^{128}$I is often fed by another long-lived state, the 167.3 keV state having a half-life of 175 ns. The corresponding 29.5 keV transition is almost completely converted. According to their research, the 167.3 keV state is mainly fed by a 2-step transition, comprising a 142 keV gamma transition from a 376 keV state to a 234 keV state, slightly converted, followed by a strongly converted 67 keV transition to the 167.3 keV state. They found that this cascade of gamma rays and conversion electrons is often involved in the decay chain following neutron capture in $^{127}$I.

Further, pulse pile-up is a well-known and persisting problem in the field of radiation detection. Nuclear reactions and accompanying de-excitation cascades occur randomly. On the one hand, the time difference between consecutive pulses recorded in gamma ray detectors follows the probability density function of an exponential distribution. Hence, small time differences between consecutive pulses are more likely than large time differences. On the other hand, the pulse duration is controlled by the decay time of the scintillator which defines the time scale for resolving distinct signals. In case the time difference between consecutive pulses becomes shorter than the pulse duration, the signals pile up. The energy determination of a corresponding event, meaning an integration of the signal over time to measure the charge content, fails in case of a pulse pile-up, i.e. it cannot provide correct results for the two piled-up signals.

Pulse pile-ups can be detected, e.g. by comparing the ratio of two shifted integrals over each signal pulse. While single pulses will always return the same ratio of the shifted integrals, the ratio of shifted integrals of pulse pile-ups deviates.

Based on the identification of pile-up events, the signals of piled-up pulses often are rejected. The major disadvantage of pulse pile-up rejection, however, is the loss of potentially valuable signal.

In a publication by Scoullar et al, AIP Conf. Proc. 1412 (2011) 270, a method for real-time decoding of pulse pile-up events for a range of detectors, including scintillation based radiation detectors, is suggested. This method is model-based and characterizes the number, time-of-arrival and energy of all events in the detector output. In doing so, composite events are decoded and energy and time-of arrival of multi-pulse pile-ups are reconstructed, with a pulse pair resolution of down to 50 ns. An important constraint of this approach is the fixation of the pulse shape expected from the detector.

Pulse pile-up decoding or reconstruction techniques have so far been of particular advantage in high-flux pulsed beam experiments with low duty cycle and relatively slow detectors, such as Free Electron Lasers for which pulse pile-ups are unavoidable and signal collection is expensive. In usual spectroscopic measurements higher count rates lead to a more severe disturbance of the spectrum due to pulse pile-up. Sufficiently high input rates, however, usually allow the partial loss of signals, rendering the pulse pile-up rejection the method of choice.

SUMMARY

Hence, an object of the present disclosure is to provide a system and a corresponding method allowing the detection of slow neutrons with common iodine-comprising scintillation detectors in a way that minimizes the above mentioned drawbacks at least partially thereby improving the sensitivity of common iodine-comprising scintillation detectors for neutron detection and the feasibility of their large-scale deployment for that purpose.

This problem may be solved by a radiation detection system and a method for detecting neutrons using delayed triple-coincidence capture gamma-ray detection. Preferred embodiments are described herein.

More specifically, the disclosure provides a radiation detection system for a parallel detection of gamma rays and neutrons, comprising a gamma-ray detector, a digitizer and an analyzer. The gamma-ray detector comprises a scintillator crystal comprising $^{127}I$ and a photodetector with an amplifier, wherein said scintillator crystal is adapted to convert energy deposited by gamma rays or conversion electrons to optical photons. The photodetector is adapted to convert the optical photons to an electrical signal. The amplifier is adapted to amplify the electrical signal, wherein the electrical signal is in a known relationship with the energy deposited by the detected gamma rays or conversion electrons in said scintillator crystal. The digitizer comprises sampling Analog to Digital Converters, ADC, wherein said digitizer is adapted to sample the electrical signal of said gamma-ray detector with a predetermined frequency of at least 20 mega samples per second to generate digitized time series of the electrical signal. The analyzer is coupled operatively to said digitizer. Said digitizer is adapted to transmit the digitized time series to the analyzer, and the analyzer is adapted to analyze the digitized time series in order to identify signal components in the digitized time series with consecutive time delays between each other of at least 20 nanoseconds and at most 10 microseconds, wherein each signal component is due to an energy deposited in the scintillator crystal.

The analyzer is further adapted to identify a primary signal component in the digitized time series corresponding to an energy deposition $E_0$ in a predefined range. The analyzer is adapted to search for a first delayed signal component in the digitized time series, the first delayed signal component corresponding to an energy deposition $E_1$ of about 30 keV, preferably between 15 keV and 50 keV, and following the primary signal component in time, and to search for a second delayed signal component in the digitized time series, the second delayed signal component corresponding to an energy deposition $E_2$ of about 138 keV, preferably between 100 keV and 200 keV, and following the first delayed signal component in time. Moreover, the analyzer is adapted to count the number of digitized time series comprising at least the first delayed signal component and the second delayed signal component as neutron events, thereby providing a measure for a neutron flux the scintillator crystal is exposed to.

The system has the advantage that no trigger holdoff is required that prevents detecting delayed signal components with a time difference of less than 1.8 μs to the primary signal component. Thus, also the signal component resulting from de-excitation of the long-lived excited state at about 167 keV having a half-life of just about 175 ns can be exploited to sharpen the search criteria for gamma rays upon neutron captures in the scintillator crystal. As a result, the radiation detection system manifests itself with a much stronger background suppression compared to other methods of neutron detection via neutron-capture gamma rays which renders the radiation detection system applicable in much stronger gamma radiation fields.

Preferably, the digitizer is even adapted to sample the electrical signal of said gamma-ray detector with a predetermined frequency of at least 100 mega samples per second.

Preferably, the analyzer is further adapted to quantify at least one event parameter of a group of event parameters for each of said digitized time series, the group of event parameters comprising:

- the time difference between said primary signal component and said first delayed signal component,
- the time difference between said primary signal component and said second delayed signal component,
- the time difference between said first delayed signal component and said second delayed signal component,
- the energy deposition in the scintillator crystal corresponding to the primary signal component,
- the energy deposition in the scintillator crystal corresponding to the first delayed signal component,
- and the energy deposition in the scintillator crystal corresponding to the second delayed signal component, and
- combinations thereof.

Moreover, the analyzer is adapted to evaluate for each of said digitized time series whether at least one event parameter of the group of event parameters fulfills a predefined criteria to classify said digitized time series as neutron event, and to count the number of digitized time series classified as neutron event, thereby providing a measure for the neutron flux the scintillator crystal is exposed to.

A preferred embodiment of the system has the further advantage that even single neutron counts, in particular thermal neutron counts may be registered even in environments with an intense ambient gamma radiation. The relatively precise quantification of at least one event parameter is sufficient to suppress the background due to random triple pulse events such that individual digitized time series representing delayed triple coincidences can be attributed to neutron event, i.e. neutron captures in $^{127}$I of the scintillator crystal.

Preferably, the photodetector of the gamma-ray detector is a photomultiplier tube, a silicon photomultiplier (SiPM), or an avalanche photodiode.

Further preferably, the photomultiplier tube comprises a super-bialkali photokathode or an ultra-bialkali photokathode.

Preferably, said scintillator crystal is a NaI crystal, preferably with Tl doping, or a CsI crystal, preferably with Na or Tl doping, or a NaI crystal, preferably with Tl doping, comprising Li or B as co-dopant.

The radiation detection system therefore has the advantage that it can be equipped with common iodine-comprising crystals which are relatively cheap and already widely applied in gamma-ray spectroscopy.

Preferably, the gamma-ray detector, the digitizer and the analyzer of the radiation detection system are small enough to be arranged in a handheld device.

Preferably, the gamma-ray detector, the digitizer and the analyzer of the radiation detection system are small enough to be arranged in a backpack.

The radiation detection system therefore is particularly well adapted to an application in the field of homeland security.

Further, embodiments of the invention provide a method to detect neutrons and gamma rays, utilizing the radiation detection system. The method comprises a number of steps according to which neutrons interact with $^{127}$I of the scintillator crystal generating $^{128}$I upon neutron capture, wherein $^{128}$I de-excites both under a prompt emission of gamma radiation and at least partially via at least one long-lived excited state feeding another long-lived excited state which at least sometimes leads to two delayed energy depositions in the scintillator crystal corresponding to the two delayed de-excitation steps producing either conversion electrons or gamma radiation interacting with the scintillator crystal, following a primary signal component which is due to the prompt emission. The gamma-ray detector generates an electrical signal in succession of an interaction between gamma rays or conversion electrons and said scintillator crystal, wherein said electrical signal is in a known relationship with the energy deposited by the detected gamma rays or conversion electrons in said scintillator crystal. The digitizer samples the electrical signal of said gamma-ray detector with a predetermined frequency of at least 20 mega samples per second, preferably at least 100 mega samples per second, to generate a digitized time series of the detected gamma rays, and transmits the digitized time series to the analyzer. The analyzer identifies a primary signal component in the digitized time series corresponding to an energy deposition $E_0$ in a predefined range, searches for a first delayed signal component in a digitized time series, the first delayed signal component corresponding to an energy deposition of about 30 keV, preferably between 15 keV and 50 keV, and following the primary signal in time, searches for a second delayed signal component, the second delayed signal component corresponding to an energy deposition of about 138 keV, preferably between 100 keV and 200 keV, and following the first delayed signal component in time. Moreover, the analyzer counts the number of digitized time series comprising at least the first delayed signal component and the second delayed signal component as neutron events, thereby providing a measure for the neutron flux the scintillator crystal is exposed to.

Preferably, the method further comprises the steps according to which the analyzer quantifies at least one event parameter of a group of event parameters for each of said digitized time series, the group of event parameters comprising:

the time difference between said primary signal component and said first delayed signal component the time difference between said primary component and said second delayed signal component the time difference between said first delayed signal component and said second delayed signal component, the energy deposition in the scintillator crystal corresponding to the primary signal component, the energy deposition in the scintillator crystal corresponding to the first delayed signal component, the energy deposition in the scintillator crystal corresponding to the second delayed signal components, and combinations thereof.

In a further step, the analyzer evaluates for each of said digitized time series whether at least one event parameter of the group of event parameters fulfills a predefined criteria to classify said digitized time series as neutron event, and eventually counts the number of digitized time series classified as neutron event, thereby providing a measure for the neutron flux the scintillator crystal is exposed to.

The method provides the advantage that it facilitates simultaneous gamma-ray spectroscopy and neutron detection with common, off-the-shelf scintillation detectors using iodine-comprising scintillators, e.g., NaI (Tl), CsI (Na) or CsI (Tl). Therefore, the method enables neutron detection capabilities in common digital gamma-ray spectrometers with iodine-comprising scintillation detectors without requiring additional hardware.

By searching for a first delayed signal component and a second delayed signal component in the digitized time series immediately after the primary signal, i.e., without a trigger holdoff as long as 1.8 μs of the digitizer, the neutron capture events can be detected much more efficiently due to a much stronger background suppression compared to other methods of neutron detection using iodine-comprising scintillator crystals, e.g., Yakushev's method. It were the inventors who first realized that the de-excitation of the long-lived excited state at 167 keV in $^{128}$I to the long-lived excited state at 138 keV in $^{128}$I provides an effective handle to discriminate the gamma ray de-excitation cascade following a neutron-capture event from random pulse pile-ups in a strong gamma-ray radiation environment. In particular, depending on the radiation background it may often not be sufficient to rely on the double-pulse structure/delayed double coincidences as seen by Yakushev et al, according to which the delayed pulses correspond to an energy deposition of about 138 keV, since random pulses with energies which are equal within the resolution of the scintillator crystal may occur. In contrast, random pulses fulfilling the search criteria of the method are much less likely, rendering said method to be much more robust in strong gamma ray radiation backgrounds which are typical for homeland security applications.

Preferably, the analyzer finds and identifies at least one delayed signal component in said digitized time series by means of pulse pile-up reconstruction techniques, utilizing a method to decompose the digitized time series comprising piled-up signal components into these components, thereby quantifying at least one of the group of event parameters.

The use of pulse pile-up reconstruction techniques has the advantage over the sequential pulse by pulse detection proposed by Yakushev that also signal components at a time delay of less than 1.8 μs from the primary signal component may be distinguished and detected. This increases the neutron detection efficiency with respect to prior art by a factor of 2 to 4 and also improves the effect-to-background ratio even when only searching for double pulses, i.e. using delayed double-coincidence events. The gain basically depends on the minimum time distance between primary and delayed signal component that is required by the pile-up reconstruction algorithm for an unambiguous signal decoding.

Most preferably, the analyzer further identifies another primary signal component in the digitized time series corresponding to an energy deposition in a predefined range, searches for a delayed signal component in the digitized time series, the delayed signal component corresponding to an energy deposition of around 138 keV, preferably between 100 keV and 200 keV, and following said primary signal component in time, quantifies at least one event parameter of the group of event parameters for each of said digitized time series, the group of event parameters further comprising:

the time difference between said primary component and said delayed signal component, the energy deposition in the scintillator crystal correspond-ing to said primary signal component, and the energy deposition in the scintillator crystal correspond-ing to said delayed signal components, evaluates for each of said digitized time series whether at least one event parameter of the group of event parameters fulfills a predefined criteria to classify said digitized time series as thermal neutron event, and counts the number of digitized time series classified as neutron event, thereby providing a measure for the neutron flux the scintillator crystal is exposed to.

The combination of searching for delayed triple coincidences and delayed double coincidences using pulse pile-up reconstruction techniques eventually yields even better effect-to-background ratios allowing the parallel detection of neutrons and gamma rays even in environments with an intense ambient gamma radiation.

In an embodiment of the invention, the method according to the invention is applied in a radiation detection system which is small enough to be arranged in a backpack.

In a further embodiment of the invention, the method according to the invention is applied in a radiation detection system which is small enough to be arranged in a handheld device.

BRIEF DESCRIPTION OF THE DRAWING

Some embodiments of the invention are explained in the following with reference to the figures. The described examples are provided for illustrative purposes and are not intended to limit the scope of the invention.

DETAILED DESCRIPTION OF THE PREFERRED EMBODIMENTS

Figure 1:
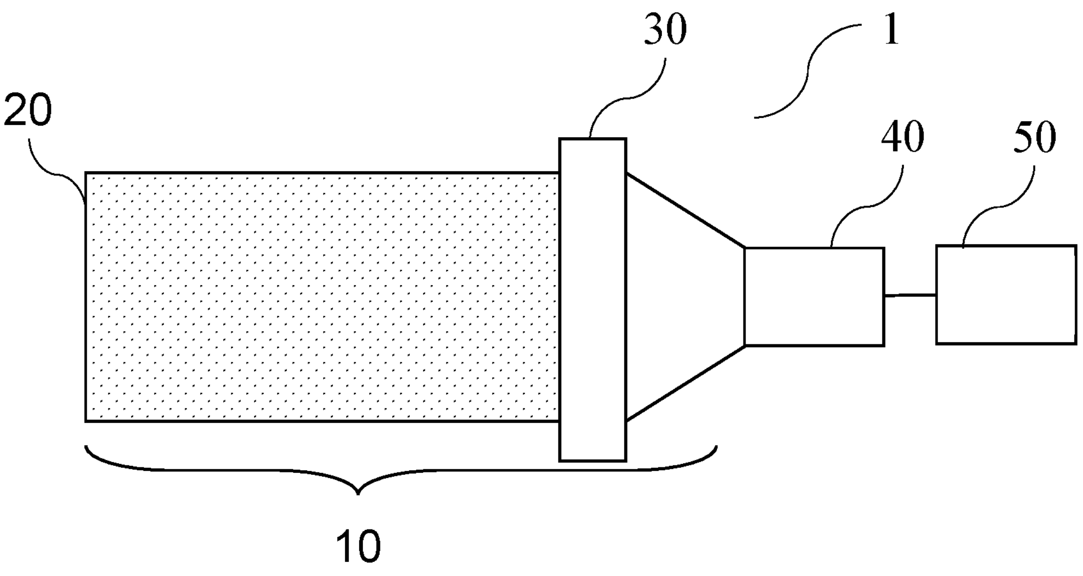
FIG. 1 is a schematic set-up of an embodiment of the radiation detection system for a parallel detection of gamma rays and neutrons as provided by the present invention.

FIG. 1 shows a first embodiment of the radiation detection system for a parallel detection of gamma rays and neutrons provided by the present invention.

Shown is a radiation detection system 1 comprising a gamma-ray detector 10, a digitizer 40 and an analyzer 50. The gamma-ray detector 10 comprises a scintillator crystal 20 comprising $^{127}I$ and a photodetector 30 with an amplifier, wherein said scintillator crystal 20 is adapted to convert energy deposited by gamma rays or conversion electrons to optical photons. The photodetector 30 is adapted to convert the optical photons to an electrical signal and the amplifier is adapted to amplify the electrical signal, wherein the electrical signal is in a known relationship with the energy deposited by the detected gamma rays or conversion electrons in said scintillator crystal 20. Preferably, the photodetector 30 is a photomultiplier tube with intrinsic signal amplification. The photomultiplier may as well be an avalanche photodiode or a silicon photomultiplier (SiPM).

Most preferably, the photomultiplier tube comprises a super-bialkali photokathode or an ultra-bialkali photokathode.

The scintillator crystal 20 comprises $^{127}I$ intrinsically, acting as neutron-gamma converter. A neutron-gamma converter is adapted to emit gamma radiation upon capturing neutrons.

More specifically, said scintillator crystal 20 is a NaI crystal, preferably with Tl doping, or a CsI crystal, preferably with Na or Tl doping, or a NaI crystal, preferably with Tl doping, comprising Li or B as co-dopant.

Needless to say, scintillator crystal 20 and the photodetector 30 may be wrapped in light reflecting materials and arranged in a housing to protect them from external light and humidity (not shown).

The embodiment of the radiation detection system of FIG. 1 further comprises a digitizer 40 comprising sampling Analog to Digital Converters, ADC. The digitizer 40 is adapted to sample the electrical signal of said gamma-ray detector with a predetermined frequency of at least 20 mega samples per second, preferably at least 100 mega samples per second, to generate digitized time series of the electrical signal.

The embodiment of the radiation detection system of FIG. 1 also comprises an analyzer 50 which is coupled operatively to said digitizer 40. The digitizer 40 is adapted to transmit the digitized time series to the analyzer 50, and the analyzer 50 is adapted to analyze the digitized time series in order to determine a measure of the neutron flux, particularly the slow neutron flux, the detector 10 is exposed to. For this purpose, the analyzer 50 is adapted to identify signal components in the digitized time series with consecutive time delays between each other of at least 20 ns and at most 10 μs, wherein each signal component is due to an energy deposition in the scintillator crystal 20.

Preferably, the analyzer 50 is adapted to analyze the digitized time series and to determine a measure for the neutron flux, particularly the slow neutron flux, the detector 10 is exposed to in real-time.

The analyzer 50 is further adapted to identify a primary signal component in the digitized time series corresponding to an energy deposition $E_0$ in a predefined range. The analyzer 50 is adapted to search for a first delayed signal component in the digitized time series, the first delayed signal component corresponding to an energy deposition $E_1$ of about 30 keV and following the primary signal component in time, and to search for a second delayed signal component in the digitized time series, the second delayed signal component corresponding to an energy deposition $E_2$ of about 138 keV and following the first delayed signal component in time. The analyzer 50 is further adapted to count the number of digitized time series comprising at least the first delayed signal component and the second delayed signal component as neutron events, thereby providing a measure for the neutron flux the scintillator crystal is exposed to.

In practice, it may be sufficient to determine the energy depositions of the delayed signal components coarsely within time and energy windows, the energy windows e.g. ranging from 15 keV to 50 keV for the first delayed signal component and from 100 keV to 200 keV for the second delayed signal component. For single neutron counts, in particular in environments with very intense ambient gamma radiation (count rates far beyond 1000 counts per second), it has been proven useful to further suppress the background of random triple pulse events by quantifying at least one event parameter of a group of event parameters more precisely.

Preferably, the group of event parameters comprises the time difference between the primary signal component and the first delayed signal component, the time difference between the primary signal component and the second delayed signal component, the time difference between the first delayed signal component and the second delayed signal component, and the corresponding energy depositions of each signal component in the scintillator crystal 20, and combinations thereof.

The inventors were the first who realized that digitized time series representing triple coincidence events, wherein each pulse of the triple coincidence events fulfills relatively coarse grained time and energy windows, may be attributed with high accuracy to neutron events if at least one of the event parameters fulfills a predefined fine-grained criteria. Examples for such a predefined criteria are a time difference between the first delayed signal component and the second delayed signal component of less than 4 μs, an energy deposition corresponding to the primary signal component of less than 300 keV, or the energy depositions corresponding to the first delayed signal component and second delayed signal component of 30 keV and 138 keV, respectively, within the resolution of the scintillator crystal 20.

More specifically, the analyzer 50 is preferably adapted to carry out pulse pile-up reconstruction techniques, wherein the pulse pile-up reconstruction techniques comprise a method to decompose the digitized time series into their signal components. Each signal component may have a pulse shape comprising an onset, the onset being characterized by a sharp rise in finite time, and an exponential decay, the exponential decay being essentially characterized by the light decay time of the scintillator crystal 20. Based on the reconstructed signal components, the analyzer 50 may quantify at least one of the group of event parameters. Time differences may be computed between the onsets of two consecutive signal components and energy depositions in the scintillator crystal 20 of a corresponding signal component may be determined by integrating the corresponding signal component.

The analyzer 50 may preferably carry out the pulse pile-up reconstruction techniques and subsequent computation of event parameters in real-time to enable an online detection of neutron events, e.g. for homeland security applications with moving sources.

Preferably, the gamma-ray detector 10 and corresponding electronics 40 and 50 are small enough to be arranged in a handheld device. Equally preferably, the gamma-ray detector 10 and corresponding electronics 40 and 50 are small enough to be arranged in a backpack. These form factors of the radiation detection system according to embodiments of the invention have been proven particularly useful for homeland security applications.

Figure 2:
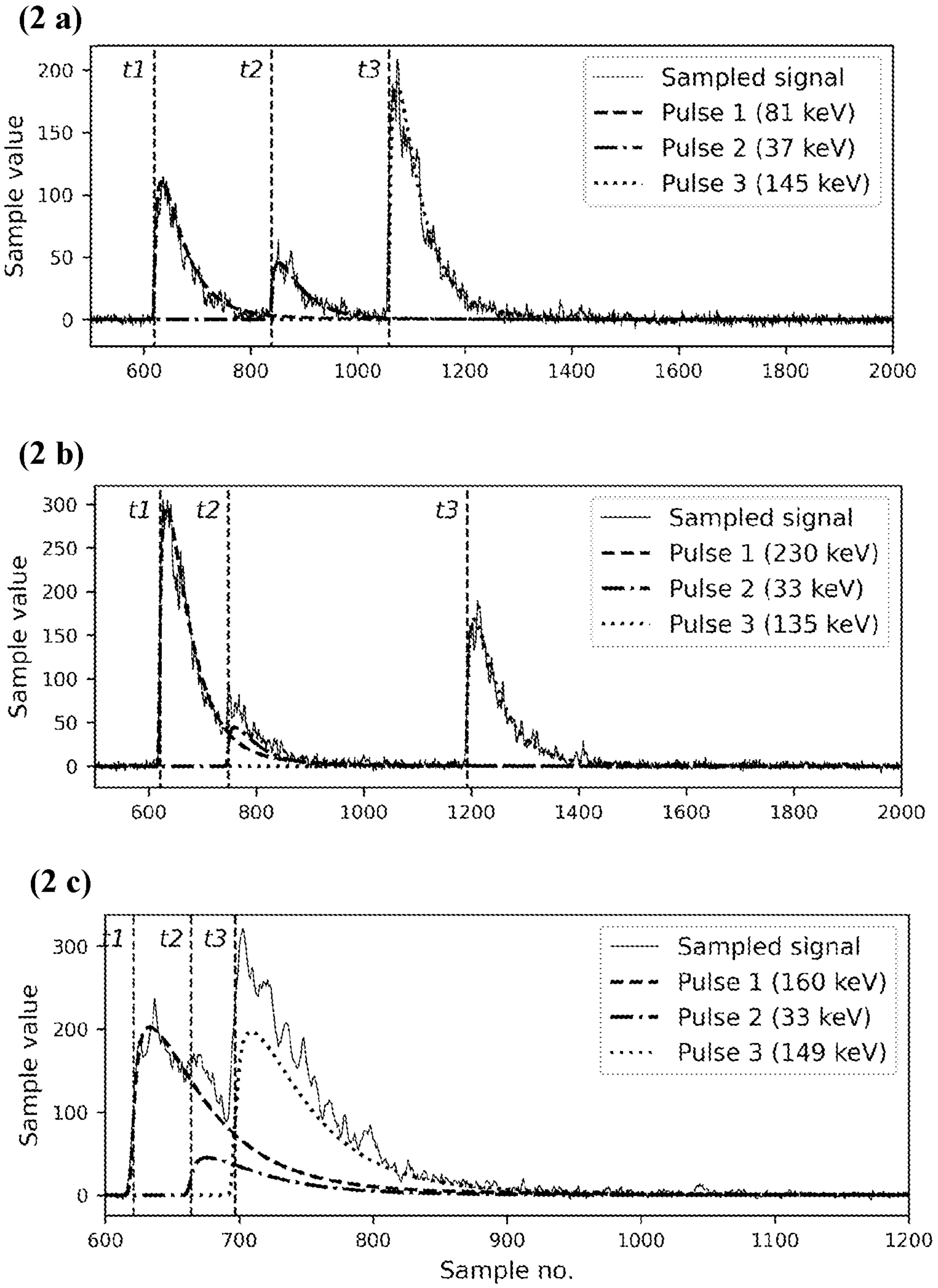
FIG. 2 is an exemplary digitized time series comprising delayed triple coincidences indicating neutron captures in $^{127}I$.

FIG. 2 shows exemplary digitized time series comprising delayed triple coincidences indicating neutron capture in $^{127}$I followed by gamma-ray cascades involving the two long-lived excited states in $^{128}$I, at about 167 keV (half-life of 175 ns) and at about 138 keV (half-life at 845 ns), respectively.

The digitized time series shown in FIG. 2 were measured as directly digitized anode currents in an embodiment of the radiation detection system comprising a 2"×2" NaI (Tl) crystal 20 coupled to a photomultiplier tube (PMT), the PMT coupled with a digital spectrometer 40 operated at a sampling rate of 250 MHz. The gamma-ray detector 10 was exposed to a moderated $^{252}$Cf neutron source. The digitized time series representing the signal components were stored and analyzed offline for delayed double and triple coincidences.

Digitized time series representing delayed triple coincidences comprise three signal components, namely a primary signal component recorded at a time t1, a first delayed signal component recorded at a time t2, and a second delayed signal component recorded at a time t3. In FIG. 2 these signal components are denoted as Pulse 1, Pulse 2, and Pulse 3, respectively. Triple coincidences as determined by the method according to embodiments of the present invention are characterized by a first delayed signal component, Pulse 2, corresponding to an energy deposition of around 30 keV in the scintillator crystal 20 and a second delayed signal component, Pulse 3, corresponding to an energy deposition of around 138 keV in the scintillator crystal 20. Note that the sub-pulse energies expressed in FIG. 2 are slightly overestimated, since the linear energy calibration used for this stage of the signal analysis does not consider the non-linearity of the NaI(Tl) light output.

Digitized time series representing delayed double coincidences comprise only two signal components, namely a primary signal component recorded at a time t1 and a delayed signal component recorded at a time t2. Delayed double coincidences as mentioned by Yakushev et al. are characterized by a delayed signal component corresponding to an energy deposition of around 138 keV in the scintillator crystal 20.

FIG. 2 shows only representations of delayed triple coincidence events which were analyzed using pulse pile-up reconstruction techniques. In case of a measurement involving a trigger holdoff, these delayed triple coincidence events are mostly mistaken as a delayed double coincidences since in most cases the first delayed signal component cannot be separated from the primary signal component because of the trigger holdoff such that a delayed trip coincidence event actually appears as a double pulse structure comprising a primary signal component and a delayed signal component corresponding to an energy deposition of about 138 keV. Real delayed double-coincidence events, however, only comprise one delayed signal component corresponding to an energy deposition of about 138 keV since the de-excitation cascades do not involve the excited state at around 167 keV (half-life of 175 ns) of $^{128}$I in these cases. Without using pulse pile-up reconstruction techniques, real delayed double-coincidences cannot be distinguished from delayed triple coincidences since the latter are also detected as double pulses, e.g. due to a trigger holdoff.

The three panels of FIG. 2 highlight three different scenarios of delayed triple coincidences found by embodiments of the method according to the present invention. The upper panel, FIG. 2*a*, shows well isolated signal components of a delayed triple coincidence which were rather rare in the recorded dataset. In particular, the first delayed signal component, Pulse 2, corresponding to an energy deposition of around 30 keV in the scintillator crystal 20, mostly piles up with the primary signal component, Pulse 1, as shown in the middle (FIG. 2*b*) and the lower panels (FIG. 2*c*) of FIG. 2. Even the second delayed signal component, Pulse 3, corresponding to an energy deposition of around 138 keV in the scintillator crystal 20, often piles up with the prompt signal component or with the first delayed signal component, as shown in FIG. 2*c*. Hence, pulse pile-up reconstruction techniques are essential to decompose the digitized time series in order to identify the relevant signal components of delayed triple coincidences indicating neutron captures in $^{127}$I.

Based on the sampling rate of the digital spectrometer 40 used for this demonstration, 1.8 μs correspond to 450 samples in the example of FIG. 2. The exemplary digitized time series of FIG. 2 therefore clearly demonstrate, that Yakushev et al., being limited by a trigger holdoff of the spectrometer of 1.8 μs, would have not only missed the first delayed signal component, Pulse 2, corresponding to an energy of around 30 keV in the scintillator crystal 20, but even also the second delayed signal component, Pulse 3, corresponding to an energy deposition of around 138 keV in the scintillator crystal 20 in all of the shown exemplary digitized time series.

The examples of delayed triple coincidences shown in FIG. 2 result from the method to detect neutrons and gamma rays, utilizing the radiation detection system according.

In a first step of the method, neutrons interact with $^{127}$I of the scintillator crystal generating $^{128}$I up on neutron capture. $^{128}$I de-excites both under a prompt emission of gamma radiation and at least partially via at least one long-lived excited state feeding another long-lived excited state, which at least sometimes leads to two delayed energy depositions in the scintillator crystal 20 corresponding to the two delayed de-excitation steps producing either conversion electrons or gamma radiation interacting with the scintillator crystal 20, following a primary signal component which is due to the prompt emission.

In a next step of the method, the gamma-ray detector 10 generates an electrical signal in succession of an interaction between gamma rays or conversion electrons and said scintillator crystal 20. The electrical signal is in a known relationship with the energy deposited by the detected gamma rays or conversion electrons in said scintillator crystal 20.

Next, the digitizer samples the electrical signal of said gamma-ray detector with a predetermined frequency of at least 20 mega samples per second, preferably at least 100 mega samples per second, to generate digitized time series of the detected gamma rays, and transmits the digitized time series to the analyzer 50.

In a further step of the method the analyzer 50 identifies a primary signal component in a digitized time series, denoted as Pulse 1 in FIG. 2, corresponding to an energy deposition $E_0$ in a predefined range. Further, the analyzer 50 searches for a first delayed signal component in the digitized time series, denoted as Pulse 2 in FIG. 2. The first delayed signal component corresponds to an energy deposition of about 30 keV and follows the primary signal with a time delay of at most 2 μs. Further, the analyzer 50 searches for a second delayed signal component, denoted as Pulse 3 in FIG. 2. The second delayed signal component corresponds to an energy deposition of about 138 keV and follows the first delayed signal component with a time delay of at most 10 μs.

It may be sufficient to simply count the number of digitizes time series in which a primary signal component, a first delayed signal component and a second delayed signal component are identified to determine a measure the neutron flux the scintillator crystal is exposed to. Preferably, however, to further suppress random background events, the analyzer 50 quantifies at least one of a group of event parameters for each of the digitized time series, and evaluates for each of said digitized time series whether at least one event parameter of the group of event parameters fulfills a predefined criteria to classify said digitized time series as neutron event. With counting the number of digitized time series classified as neutron event the analyzer 50 provides a measure for a thermal neutron flux the scintillator crystal 20 is exposed to.

As demonstrated by the examples shown in FIG. 2 the analyzer 50 preferably is adapted to find and to identify the delayed triple coincidences in the digitized time series by means of pulse pile-up reconstruction techniques. For pulse pile-up reconstruction, the analyzer uses a method to decompose the digitized time series to their components. Thereby, the analyzer 50 quantifies at least one of the group of event parameters for each of the digitized time series.

The event parameters quantified by the analyzer 50 of the delayed triple coincidences shown in FIG. 2 comprise the time differences between the primary signal component (Pulse 1) and the first delayed signal component (Pulse 2), denoted by t21, and between the first delayed signal component (Pulse 2) and the second delayed signal component (Pulse 3), denoted by t32. The latter time difference, t32, will be discussed further with respect to FIG. 3.

Figure 3:
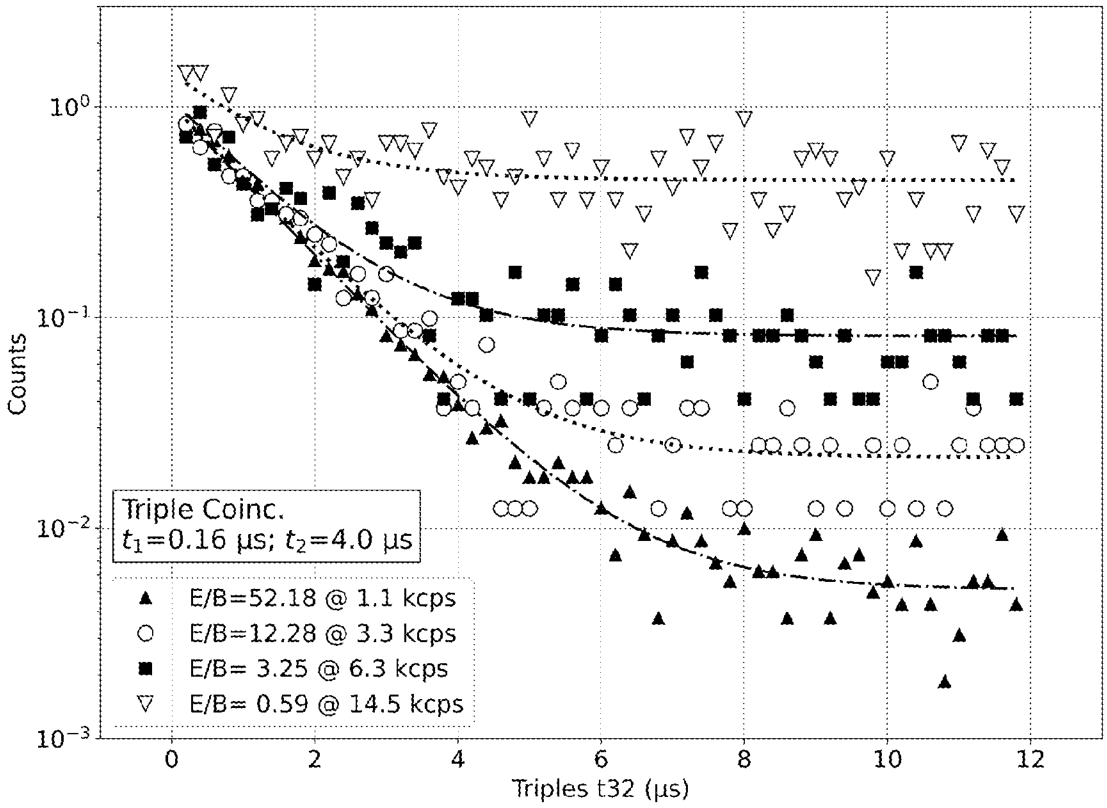
FIG. 3 shows distributions of time differences t32 between the second delayed signal component and the first delayed signal component of delayed triple coincidences, measured at different detector loads.
Figure 4:
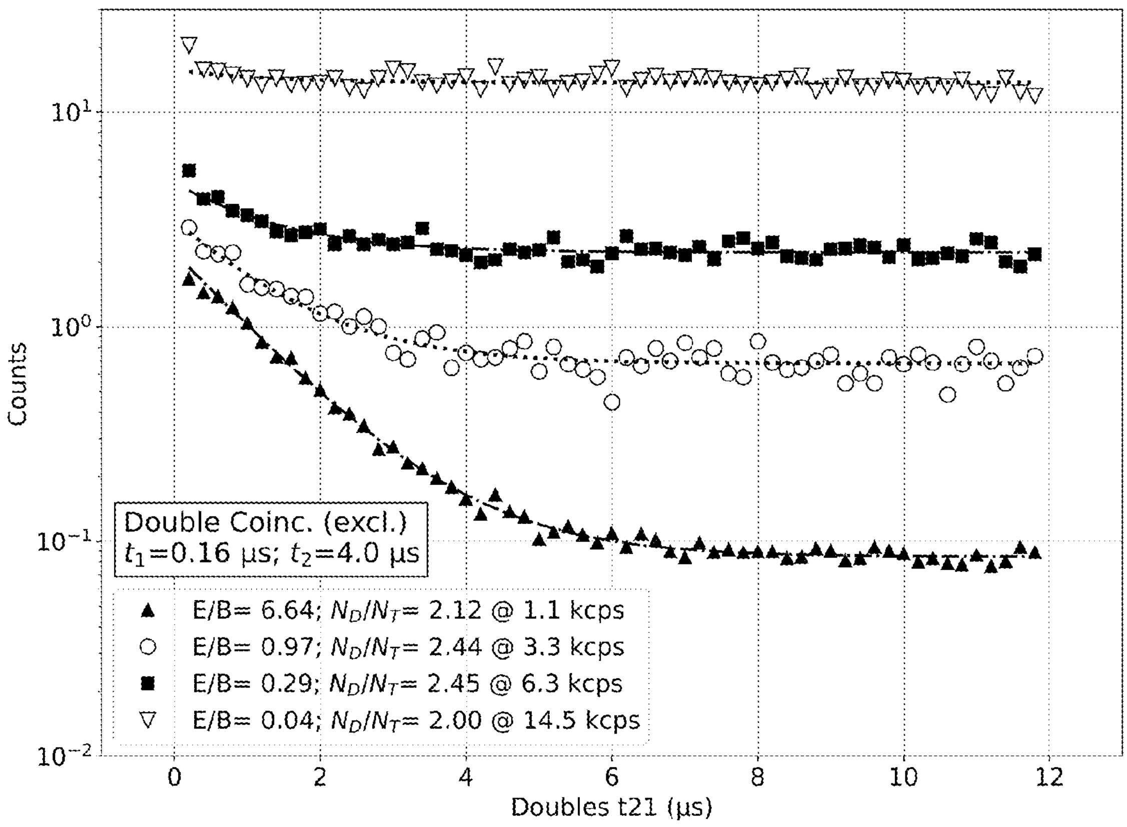
FIG. 4 shows distributions of time differences t21 between a delayed signal component and the primary signal component of delayed double coincidences, measured at different detector loads and analyzed using pulse pile-up reconstruction, the analysis excluding all detected delayed triple-coincidence events.

The analyzer 50 is preferably adapted to compute a measure for the neutron flux, particularly the slow neutron flux, the detector 10 is exposed to, from the event parameters, as explained with respect to FIG. 3 and FIG. 4.

FIG. 3 shows distributions of time differences t32 between the second delayed signal component, corresponding to an energy deposition of around 138 keV in the scintillator crystal 20, and the first delayed signal component, corresponding to an energy deposition of around 30 keV in the scintillator crystal 20, of delayed triple coincidences as shown in FIG. 2, measured at different detector loads as indicated in the figure.

The data was measured with the detector 10, as described with respect to FIG. 2, being exposed to a moderated $^{252}Cf$ neutron source. The signal analysis was performed with the same algorithm as used for the analysis of signals shown in FIG. 2. Additional detector load was generated by complementary Th ore and $^{137}Cs$ sources arranged at various distances from the scintillator crystal 20. The distributions of time differences measured at different detector loads are denoted by different symbols.

The t32 distributions were fitted with the fit function $f(t)=a\cdot e^{-\lambda\cdot t}+b$, with $\lambda=0.693/0.845$ μs representing the decay constant corresponding to a half-life of 845 ns, and then normalized with respect to the fit parameter a. The fits curves are also shown in the figure.

The fit parameter a measures the strength of the second delayed signal component (half-life of 845 ns) in the t32 distribution characterizing the second delayed transition, and thus the number of neutrons detected in a corresponding measurement. This means that all distributions shown in FIG. 3 are normalized to the same number of neutrons. The fit parameter b measures the background of random delayed triple coincidences which are not due to neutron captures in $^{127}I$. Also given in FIG. 3 are effect-to-background ratios E/B which are derived from the fit parameters. The effect-to-background ratios are computed from the number of neutrons $$N_n = \int_{t1}^{t2} a\cdot e^{-\lambda\cdot t}dt = \frac{a}{\lambda}\left[e^{-\lambda\cdot t_1} - e^{-\lambda\cdot t_2}\right]$$

divided by the background contribution in the same time interval $$N_{bck} = \int_{t1}^{t2} b\, dt = b\cdot(t_2 - t_1)$$

for an integration time ranging from $t_1=0.16$ μs, which is the minimum detectable time difference between piled-up signal components with the pulse pile-up reconstruction algorithm used for analyzing the data, to $t_2=4.0$ μs, which is a reasonable limit covering most neutron signals but not too much background. Note that the choice of the integration time range affects the E/B ratio. While $t_1$ should always be set to the minimum detectable pulse delay to maximize the number of neutron counts considered, the optimum $t_2$ value is affected by the background contribution, which varies with the actual detector load. The E/B ratios given here thus represent no general result, but exemplary values illustrating the trend: Time distributions as well as the corresponding E/B ratios reflect the rising background contribution towards higher detector load. However, the neutron contribution, distinguished by an exponential decay with a decay constant corresponding to 845 ns half-life, is still visible and can be quantified even at a detector load around 15 kcps in terms of the fit parameter a.

Preferably, the analyzer 50 computes a measure for the thermal neutron flux the scintillator crystal 20 is exposed to by determining a distribution of time differences t32 between the second delayed signal component and the first delayed signal component, fitting said distribution using a function comprising an exponential decay component corresponding to the half-life of the second delayed signal component and a scaling factor, wherein the scaling factor represents the number of (thermal) neutrons detected. Similarly, the number of neutrons may be obtained from the distribution of time differences between the first delayed signal component and the primary signal component, and even from the distribution between the second delayed signal component and the primary signal component, as long as the functions are adapted to comprise the corresponding exponential decay components.

Also preferably, the analyzer 50 computes another event parameter, the time difference t21 between the first delayed signal component and the primary signal. By selecting only such delayed triple-coincidence events as potential neutron counts being considered for further analysis, e.g. for accumulating the t32 distribution, where t21 does not exceed a predefined limit, preferably 2 μs, more preferably 1.5 μs, the effect-to-background ratio is increased at the expense of the effect count rate.

Also preferably, the analyzer 50 computes another event parameter, the energy deposition in the scintillator crystal 20 corresponding to the primary signal, $E_0$. By selecting only such delayed triple-coincidence events as potential neutron counts being considered for further analysis, e.g. for accumulating the t32 distribution, where E_0 corresponds, within the energy resolution of the gamma detector, to the energy of a strong transition leading to the 167.3 keV state in $^{128}I$, preferably 142 keV or 67 keV, or to the sum energy of such transitions, the effect-to-background ratio is increased at the expense of the effect count rate.

Similarly preferably, the analyzer 50 computes other event parameters, the energy depositions in the scintillator crystal 20 corresponding to the first and/or the second delayed signal components, $E_1$ and/or $E_2$, respectively. By selecting only such delayed triple-coincidence events as potential neutron counts being considered for further analysis, e.g. for accumulating the t32 distribution, where $E_1$ corresponds, within the energy resolution of the gamma detector, to the 30 keV transition feeding the 137.8 keV state in $^{128}I$, and/or $E_2$ corresponds, within the energy resolution of the gamma detector, to the 138 keV energy released during de-excitation of the 137.8 keV state in $^{128}I$, the effect-to-background ratio is increased at the expense of the effect count rate.

In general, said predefined criteria applied to one or more event parameters, eventually combined to a set of criteria, can be used to further increase the effect-to-background ration on the expense of the effect (i.e., neutron) count rate. This allows dynamically adapting the sensitivity of the radiation detection system 1 with respect to neutron detection to the ambient gamma-ray background by using sets of more or less restrictive criteria, depending on said ambient background. In case of low ambient gamma background, weak or even no criteria applied to the event parameters maximize the neutron count rate at still acceptable background in the neutron counts. In case of a strong ambient gamma background, leading to an increased number of random delayed triple coincidences, more restrictive event selection criteria reduce the neutron sensitivity but may still allow quantifying the neutron flux the scintillator crystal 20 is exposed to.

FIG. 4 shows distributions of time differences t21 between a delayed signal component and the primary signal component of delayed double coincidences comprised in the same data sets as referenced above with respect to FIGS. 2 and 3.

The event parameter t21, representing the time difference (delay) between the delayed signal component corresponding to an energy deposition of around 138 keV in the scintillator crystal 20 and the primary signal component, was quantified by the analyzer 50. The time distributions shown in FIG. 4 exclusively comprise delayed double coincidence events according to which a delayed signal component corresponding to an energy depositions of about 138 keV but no preceding delayed signal component corresponding to an energy deposition of about 30 keV was detected. FIG. 4 thus exhibits data that may be used for neutron detection in addition to the delayed triple coincidence events discussed with respect to FIGS. 2 and 3.

The t21 distributions were fitted with the function $f(t)=a\cdot e^{-\lambda\cdot t}+b$, with $\lambda=0.693/0.845$ µs, but (for better precision) normalized with the neutron contributions obtained from the delayed triple coincidence data shown in FIG. 3. The effect-to-background ratios E/B were determined from fits applying the formulae and integration time ranges as used for FIG. 3 to the t21 distributions shown in FIG. 4. The numbers $N_D/N_T$ given in FIG. 4 denote the ratios of neutron counts derived from the t21 distribution of delayed double coincidences ($N_D$) as given in the FIG. 4 to the neutron counts derived from the t32 distribution of delayed triple coincidences ($N_T$) in the same measurement as referenced above with respect to FIG. 3. These numbers quantify, in other words, the ratio of the effect count rates exploiting delayed double coincidences only, or delayed triple coincidences only, wherein the effect count rates were both obtained from the same data set and using the same pulse pile-up reconstruction algorithm.

It is obvious that the delayed triple coincidences provide a much better—in these exemplary cases by about an order of magnitude better—effect-to-background ratio for neutron counting than the delayed double coincidences, while the neutron contribution measured with delayed double coincidences is only about twice the neutron contribution measured with delayed triple coincidences. Nevertheless the neutron contribution measured with delayed double coincidences provides an additional and valuable measure for the neutron flux the scintillator crystal 20 is exposed to.

In a preferred embodiment of the invention the analyzer 50 measures the neutron flux the scintillator crystal 20 is exposed to from the neutron contribution derived from delayed double coincidences and from the neutron contribution derived from delayed triple coincidences, both contributions obtained from a pile-up re-construction algorithm that allows decomposing piled-up pulses and a subsequent event parameter analysis, thus increasing the accuracy of the neutron flux measurement.

Figure 5:
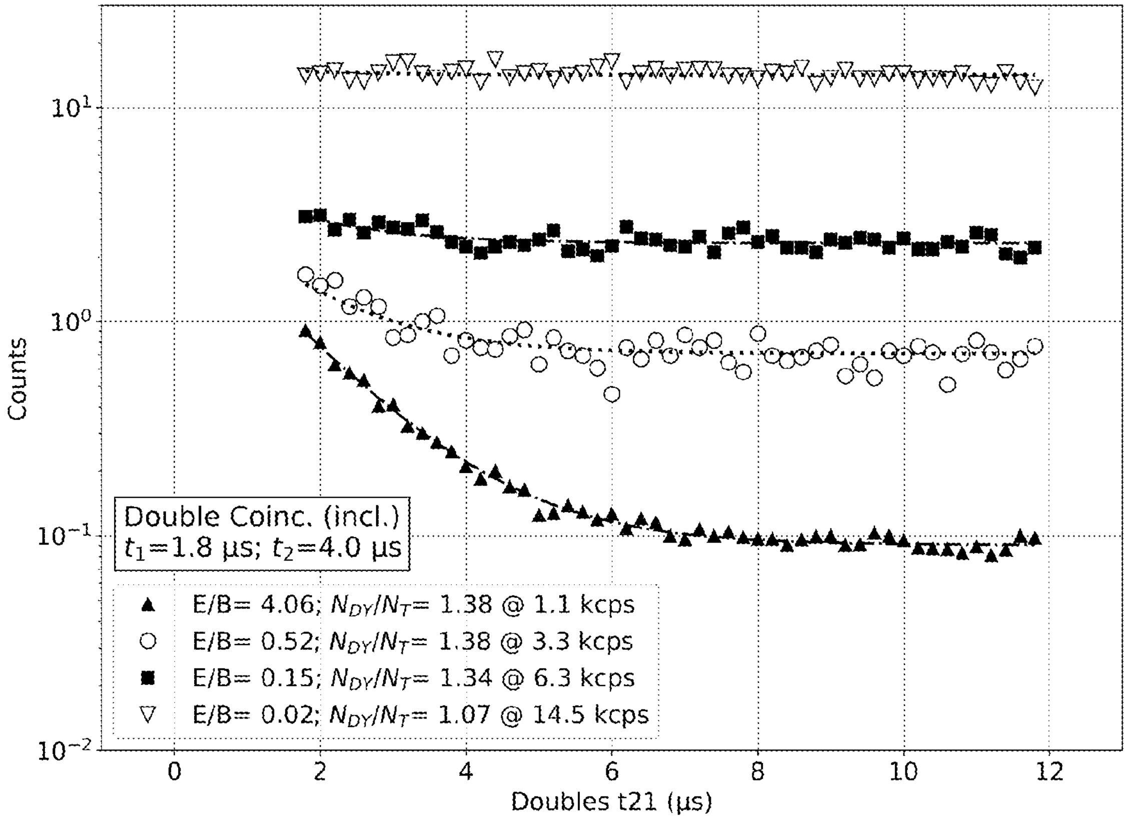
Fig. 5 (prior art)
FIG. 5 shows distributions of time differences t21 between a delayed signal component corresponding to an energy deposition of 138 keV and the primary signal component of delayed double coincidences, measured at different detector loads with a trigger holdoff of 1.8 μs, thereby corresponding to prior art. This analysis also includes delayed triple coincidences, however, without being detected as such, as the first delayed signal component is hidden due to the trigger holdoff.

FIG. 5 shows distributions of time differences t21 between a delayed signal component corresponding to an energy deposition of 138 keV and the primary signal component of delayed double coincidences, measured at different detector loads with a simulated trigger holdoff of 1.8 µs, the analysis also including delayed triple coincidences, however, without being detected as such, as the first delayed signal component is hidden due to the trigger holdoff. thereby simulating prior art. All detected delayed coincidences are comprised in the same data as references above with respect to FIGS. 2 to 4.

In contrast to FIG. 4, the time distributions of FIG. 5 comprise all events exhibiting a delayed 138 keV signal, even if a preceding 30 keV signal was originally detected by the pulse pile-up reconstruction algorithm but ignored because of the simulated trigger holdoff. Also in contrast to FIGS. 3-4, the integration time range here starts at $t_1=1.8\mu$, which corresponds to the trigger holdoff applied in Yakushev's measurement. The data shown in FIG. 5 thus represent t21 distributions and effect-to-background ratios E/B that would be measured under equivalent conditions with a setup according to prior art as described by Yakushev et al. The numbers $N_{DY}/N_T$ denote the ratios of the neutron counts, achievable with a delayed double-coincidence analysis according to prior art, to the neutron counts obtained by delayed triple-coincidence analysis with the method under equivalent conditions as shown in FIG. 3.

The analysis of delayed triple coincidence events obviously provides a much better, by more than an order of magnitude better, effect-to-background ratio than prior art, while the effect rates are rather comparable. Moreover, if delayed double-coincidence are not excluded but also considered separately as shown in FIG. 4, the effect rate with the method is about twice that of the rate achievable with prior art, while the effective effect-to-background ratio is much higher.

Hence, FIG. 3 and FIG. 5 demonstrate clearly the advantage of the method and radiation detection system according to embodiments of the present invention based on delayed triple coincidences compared with the method described by Yakushev et al. based on delayed double coincidences by a direct comparison of effect-to-background ratios and effect rates using exemplary, consistent experimental data obtained under realistic conditions.

REFERENCE NUMERALS

1 Radiation detection system
10 Gamma-ray detector
20 Scintillator crystal
30 Photodetector with an amplifier
40 Digitizer
50 Analyzer
E/B Effect-to-background ratio
$N_D$ Number of detectible neutron counts based on delayed double coincidences
$N_T$ Number of detectible neutron counts based on delayed triple coincidences
$N_{DY}$ Number of detectible neutron counts using prior art
t1 Detection time of primary signal component
t2 Detection time of first delayed signal component
t3 Detection time of second delayed signal component
t21 Time difference between a delayed signal component (138 keV) and the primary signal component
t32 Time difference between the second delayed signal component (138 keV) and the first delayed signal component (30 keV)

What is claimed is:

1. A radiation detection system for a parallel detection of gamma rays and neutrons, comprising:

a gamma-ray detector comprising a scintillator crystal comprising $^{127}I$ and a photodetector with an amplifier, wherein the scintillator crystal is adapted to convert energy deposited by gamma rays or conversion electrons to optical photons, wherein the photodetector is adapted to convert the optical photons to an electrical signal and the amplifier is adapted to amplify the electrical signal, and wherein the electrical signal is in a known relationship with the energy deposited by the detected gamma rays or conversion electrons in the scintillator crystal;

a digitizer comprising sampling an analog to digital converter (ADC) wherein said digitizer is adapted to sample the electrical signal of said gamma-ray detector with a predetermined frequency of at least 20 mega samples per second to generate digitized time series of the electrical signal; and, an analyzer operatively coupled to said digitizer, wherein said digitizer is adapted to transmit the digitized time series to the analyzer, and wherein the analyzer is adapted to analyze the digitized time series in order to identify signal components in the digitized time series with time delays of at least 20 ns and at most 10 μs between consecutive signal components, wherein each signal component is due to an energy deposition in the scintillator, wherein the analyzer is further adapted to:

identify a primary signal component in the digitized time series corresponding to an energy deposition $E_0$ in a predefined range;

identify a first delayed signal component in the digitized time series, wherein the first delayed signal component corresponds to an energy deposition $E_1$ ranging between 15 keV and 50 keV; and, identify a second delayed signal component in the digitized time series, after the first primary signal component, wherein the second delayed signal component corresponds to an energy deposition $E_2$ ranging between 100 keV and 200 keV; and occurring after the first delayed signal component, and;

count the number of digitized time series comprising at least the first delayed signal component and the second delayed signal component as neutron events, thereby providing a measure for a neutron flux exposure to the scintillator crystal.

2. The radiation detection system of claim 1, wherein the analyzer is further adapted to:

quantify at least one event parameter of a group of event parameters for each of said digitized time series, wherein the group of event parameters comprises at least one of: a time difference between said primary signal component and said first delayed signal component, a time difference between said primary component and said second delayed signal component, a time difference between said first delayed signal component and said second delayed signal component, the energy deposition in the scintillator crystal corresponding to the primary signal component, the energy deposition in the scintillator crystal corresponding to the first delayed signal component, and the energy deposition in the scintillator crystal corresponding to the second delayed signal components;

evaluate for each of said digitized time series whether at least one event parameter of the group of event parameters fulfills a predefined criteria to classify said digitized time series as a neutron event; and count the number of digitized time series classified as a neutron event, thereby providing a measure for the neutron flux exposure to the scintillator crystal.

3. The radiation detection system of claim 2, wherein the photomultiplier tube comprises a super-bialkali photokathode or an ultra-bialkali photokathode.

4. The radiation detection system of claim 1, wherein the photodetector of the gamma-ray detector is a photomultiplier tube, a silicon photomultiplier (SiPM), or an avalanche photodiode.

5. The radiation detection system of claim 1, wherein said scintillator crystal is at least one of a NaI crystal or a CsI crystal.

6. The radiation detection system of claim 5, wherein said scintillator crystal is a NaI crystal with Tl doping.

7. The radiation detection system of claim 5, wherein said scintillator crystal is a CsI crystal with at least one of Na or Tl doping.

8. The radiation detection system of claim 5, wherein said scintillator crystal is a NaI crystal with Tl doping and a co-dopant of at least one of Li or B.

9. The radiation detection system of claim 1, wherein the gamma-ray detector, the digitizer and the analyzer are configured in a handheld device.

10. The radiation detection system of claim 1, wherein the gamma-ray detector, the digitizer and the analyzer are configured in a backpack.

11. The radiation detection system of claim 1, wherein the first delayed signal component corresponds to an energy deposition $E_1$ of about 30 keV.

12. The radiation detection system of claim 1, wherein the second delayed signal component corresponds to an energy of about 138 keV.

13. A method to detect neutrons and gamma rays, comprising a gamma-ray detector including a $^{127}$I scintillator crystal and a photodetector with an amplifier, a digitizer comprising an analog to digital converter (ADC) and, an analyzer operatively coupled to said digitizer, wherein the method comprises the following steps:

generating $^{128}$I upon neutron capture of neutrons interacting with $^{127}$I of the scintillator crystal, wherein $^{128}$I de-excites both under a prompt emission of gamma radiation and at least partially via at least one long-lived excited state feeding another long-lived excited state, which at least sometimes leads to two delayed energy depositions in the scintillator crystal corresponding to two delayed de-excitation steps producing either conversion electrons or gamma radiation interacting with the scintillator crystal, following a primary signal component which is due to the prompt emission;

generating, by said gamma ray detector, an electrical signal in succession of an interaction between gamma rays or conversion electrons and said scintillator crystal, wherein said electrical signal is in a known relationship with the energy deposited by the detected gamma rays or conversion electrons in said scintillator crystal;

sampling, by said digitizer, the electrical signal of said gamma-ray detector with a predetermined frequency of at least 20 mega samples per second to generate a digitized time series of the detected gamma rays, and transmitting the digitized time series to the analyzer;

identifying, by said analyzer, a primary signal component in the digitized time series corresponding to an energy deposition $E_0$ in a predefined range;

searching, by said analyzer, for a first delayed signal component in the digitized time series, wherein the first delayed signal component corresponds to an energy deposition ranging between 15 kV and 50 keV, and following the primary signal in time;

searching, by said analyzer, for a second delayed signal component, wherein the second delayed signal component corresponds to an energy deposition ranging between 100 keV and 200 keV; and counting, by said analyzer, the number of digitized time series comprising at least the first delayed signal component and the second delayed signal component as neutron events, thereby providing a measure for the neutron flux exposure to the scintillator crystal.

14. The method of claim 13, wherein the analyzer is further configured to:

quantify at least one event parameter of a group of event parameters for each of said digitized time series, the group of event parameters comprising at least one of: a time difference between said primary signal component and said first delayed signal component, a time difference between said primary component and said second delayed signal component, a time difference between said first delayed signal component and said second delayed signal component, the energy deposition in the scintillator crystal corresponding to the primary signal component, the energy deposition in the scintillator crystal corresponding to the first delayed signal component, the energy deposition in the scintillator crystal corresponding to the second delayed signal components;

evaluate, for each of said digitized time series, whether at least one event parameter of the group of event parameters fulfills a predefined criteria to classify said digitized time series as a neutron event; and count the number of digitized time series classified as neutron a event, thereby providing a measure for the neutron flux exposure to the scintillator crystal.

15. The method of claim 14, wherein said analyzer is further configured to finds and identify at least one delayed signal component in said digitized time series by means of pulse pile-up reconstruction techniques and decompose the digitized time series comprising piled-up signal components, thereby quantifying at least one of the group of event parameters.

16. The method of claim 13, wherein said analyzer is further configured to:

identify a second primary signal component in the digitized time series corresponding to an energy deposition in a predefined range;

search for a delayed signal component in the digitized time series, wherein the delayed signal component corresponds to an energy deposition ranging between 100 keV and 200 keV; and, quantify at least one event parameter of the group of event parameters for each of said digitized time series, wherein the group further comprises at least one of: a time difference between said primary component and said delayed signal component, the energy deposition in the scintillator crystal corresponding to said primary signal component, and the energy deposition in the scintillator crystal corresponding to said delayed signal components, evaluate, for each of said digitized time series, whether at least one event parameter of the group of event parameters fulfills a predefined criteria to classify said digitized time series as a thermal neutron event; and, count the number of digitized time series classified as a neutron event, thereby providing a measure for the neutron flux exposure to the scintillator crystal.

17. The method of claim 13, wherein the first delayed signal component corresponds to an energy deposition $E_1$ of about 30 keV and wherein the second delayed signal component corresponds to an energy of about 138 keV.

18. The method of claim 13, wherein the scintillator crystal is adapted to convert energy deposited by gamma rays or conversion electrons to optical photons, wherein the photodetector is adapted to convert the optical photons to an electrical signal, wherein the amplifier is adapted to amplify the electrical signal, and wherein the electrical signal is in a known relationship with the energy deposited by the detected gamma rays or conversion electrons in the scintillator crystal.

19. The method of claim 13, wherein the digitizer comprises an analog to digital converter (ADC), and wherein said digitizer is adapted to sample the electrical signal of said gamma-ray detector with a predetermined frequency of at least 20 mega samples per second to generate digitized time series of the electrical signal.

20. The method of claim 13, wherein the analyzer is operatively coupled to said digitizer, wherein said digitizer is adapted to transmit the digitized time series to the analyzer, wherein the analyzer is adapted to analyze the digitized time series in order to identify signal components in the digitized time series with time delays of at least 20 ns and at most 10 μs between consecutive signal components, and wherein each signal component is due to an energy deposition in the scintillator.

* * * * *